US008155126B1

(12) United States Patent
Mao et al.

(10) Patent No.: US 8,155,126 B1
(45) Date of Patent: Apr. 10, 2012

(54) METHOD AND APPARATUS FOR INFERRING NETWORK PATHS

(75) Inventors: Zhuoqing Morley Mao, Ann Arbor, MI (US); Lili Qiu, Austin, TX (US); Jia Wang, Randolph, NJ (US); Yin Zhang, Austin, TX (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 575 days.

(21) Appl. No.: 11/289,944

(22) Filed: Nov. 30, 2005

Related U.S. Application Data

(60) Provisional application No. 60/687,103, filed on Jun. 3, 2005.

(51) Int. Cl.
  *H04L 12/50* (2006.01)
  *H04L 12/56* (2006.01)
  *H04L 12/28* (2006.01)
  *H04Q 11/00* (2006.01)

(52) U.S. Cl. ..... 370/397; 370/381; 370/392; 370/395.31

(58) Field of Classification Search ................. 370/381, 370/392, 395.31, 397; 709/218, 224, 242
See application file for complete search history.

(56) References Cited

U.S. PATENT DOCUMENTS

| 5,068,656 | A | * | 11/1991 | Sutherland | ............ | 340/989 |
| 6,728,214 | B1 | * | 4/2004 | Hao et al. | ............ | 370/241 |
| 6,981,055 | B1 | * | 12/2005 | Ahuja et al. | ............ | 709/238 |
| 7,139,242 | B2 | * | 11/2006 | Bays | ............ | 370/238 |
| 7,200,658 | B2 | * | 4/2007 | Goeller et al. | ............ | 709/224 |
| 2002/0101821 | A1 | * | 8/2002 | Feldmann et al. | ............ | 370/232 |
| 2002/0191541 | A1 | * | 12/2002 | Buchanan et al. | ............ | 370/230 |
| 2004/0039839 | A1 | * | 2/2004 | Kalyanaraman et al. | ..... | 709/238 |
| 2005/0050225 | A1 | * | 3/2005 | Tatman | ............ | 709/244 |
| 2005/0265356 | A1 | * | 12/2005 | Kawarai et al. | ............ | 370/395.53 |
| 2006/0092856 | A1 | * | 5/2006 | Mitsumori | ............ | 370/254 |
| 2006/0114916 | A1 | * | 6/2006 | Vasseur et al. | ............ | 370/397 |
| 2006/0153200 | A1 | * | 7/2006 | Filsfils et al. | ............ | 370/395.31 |

OTHER PUBLICATIONS

G. Battista, et al., Computing the Types of the Relationships Between Autonomous Systems, in Proc. IEEE INFOCOM, Mar. 2003.
M. Coates, et al., Maximum Likelihood Network Topology Identification from Edge-Based Unicast Measurements, in Proc. ACM SIGMETRICS, vol. 30, Issue 1, Jun. 2002.
R. Govindan, et al., Heuristics for Internet Map Discovery, IEEE INFOCOM, pp. 1371-1380, Mar. 2000.
R. Mahajan, et al., Inferring Link Weights Using End-to-End Measurements, in Proc. Internet Measurement Workshop, Session 8, pp. 231-236, Nov. 2002.
Z. M. Mao, et al., Scalable and Accurate Identification of AS-Level Forwarding Paths, in Proc. IEEE INFOCOM, Mar. 2004.
Z. M. Mao, et al., Towards an Accurate AS-Level Traceroute Tool, in Proc. ACM SIGCOMM, pp. 365-378, Aug. 2003.
V. Paxson, End-to-End Routing Behavior in the Internet, IEEE/ACM Trans. Networking, pp. 601-615, Oct. 1997.

(Continued)

*Primary Examiner* — Hassan Phillips
*Assistant Examiner* — Lonnie Sweet

(57) ABSTRACT

Disclosed is a method and apparatus for inferring AS paths between two endpoint nodes communicating over a network having a plurality of nodes without having access to the endpoint nodes. The method and apparatus determine routing tables of at least some of the plurality of nodes. A relationship between each node is then inferred from the routing tables. The method and apparatus then determine a path between the two endpoint nodes from the relationship and the routing table determination.

8 Claims, 4 Drawing Sheets

OTHER PUBLICATIONS

J. Rexford, et al., BGP Routing Stability of Popular Destinations, In Proc. Internet Measurement Workshop, pp. 197-202, Nov. 2002.
N. Spring, et al., Measuring ISP Topologies with Rocketfuel. In Proc. ACM SIGCOMM, Aug. 2002.
L. Subramanian, et al., Characterizing the Internet Hierarchy from Multiple Vantage Points, in. Proc. IEEE INFOCOM, Jun. 2002.
X. Zhao, et al., An Analysis of BGP Multiple Origin AS (MOAS) Conflicts, in Proc. Internet Measurement Workshop, Aug. 2001.

* cited by examiner

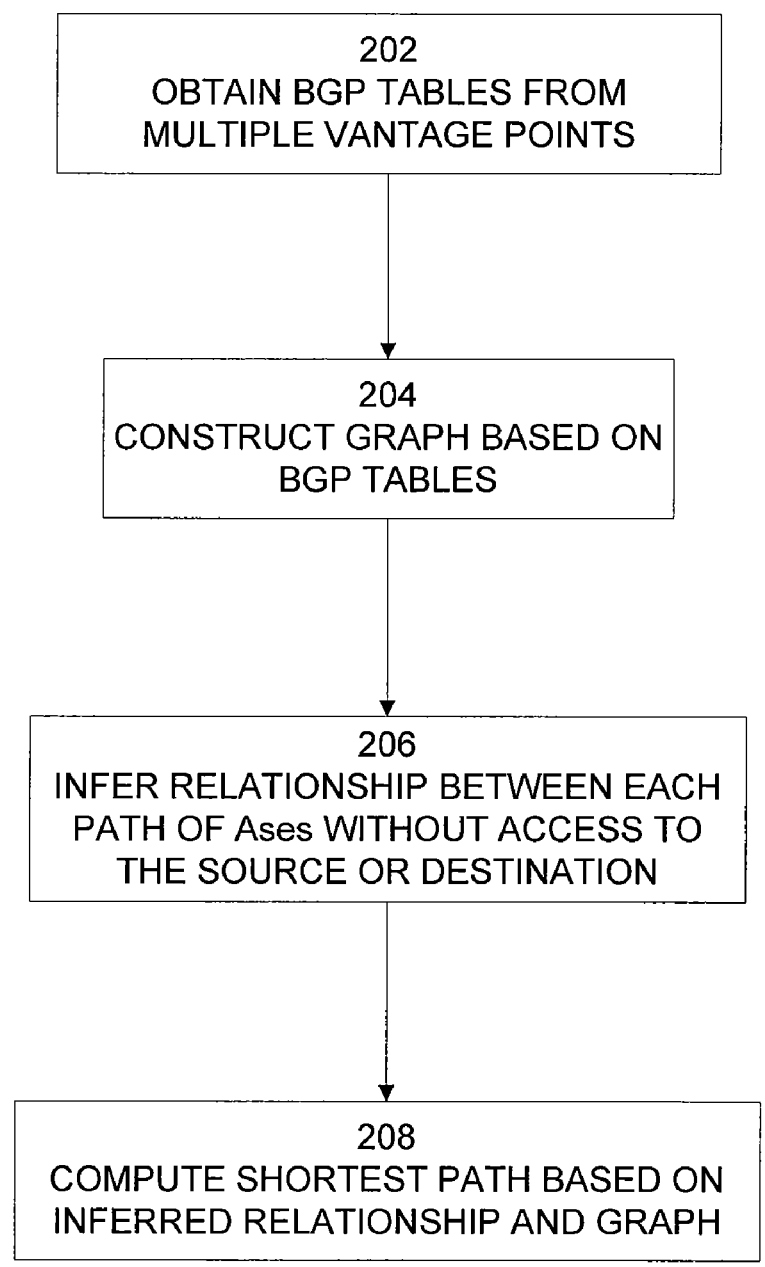

FIG. 3

```
iteration = 0; num_no_prog = 0;
    while (iteration < maxFlips or numNoProg < maxNoProg) {
        if (rand() < walk_prob)
            progress = random_walk();
        else
            progress = greedy();
        iteration++;
        if (progress=0)numNoProg=0;
        else numNoProg++;
    } greedy() {
  max_prog = 0
  for each edge e {
      if numUnsatConsWithEdge(e) < max_prog
              continue
      else
              for each relation r ≠ currentRelation(e)
              rel(e) = r
              rel(reverse (e)) = 4 - r
              prog = reducedNumOfUnsatCons();
              if (prog < max_prog
              max_prog=prog
              action = "e=> r"
      }
  }
```

METHOD AND APPARATUS FOR INFERRING NETWORK PATHS

This application claims the benefit of U.S. Provisional Application No. 60/687,103 filed Jun. 3, 2005, which is incorporated herein by reference.

BACKGROUND OF THE INVENTION

The present invention relates generally to autonomous systems, and more particularly to discovering network paths in autonomous systems.

An autonomous system (AS) is a collection of networks (i.e., the routers joining those networks) under the same administrative authority and that share a common routing strategy. The Internet includes over 20,000 inter-connected ASes controlled by different administrative domains such as Internet Service Providers (ISPs), corporations, universities, and research institutions.

Different ASes interact with each other in a complex manner through the use of a Border Gateway Protocol (BGP), which is a protocol for exchanging routing information between nodes (e.g., routers). BGP enables each individual administrative domain to specify its own routing policies.

The enormous scale and highly heterogeneous and uncooperative nature of the Internet have made it a major challenge for today's network operators to understand routing protocol behavior and detect and diagnose problems. In particular, discovering paths in a network provides valuable information for network operators. Network operators can detect and diagnose problems, study routing protocol behavior, characterize end-to-end paths through the Internet, and better understand network performance when network paths are discovered.

There are several currently available tools and techniques that network operators use for path discovery. For example, traceroute is a utility that traces a packet from a source node (e.g., a user's computer) to an Internet host. Traceroute shows how many hops the packet requires to reach the host and its duration. A user can therefore determine where the longest delays are occurring if the user is visiting a web site and web pages are appearing slowly. Traceroute utilities work by sending packets with low time-to-live (TTL) fields from the source node. The TTL value specifies how many hops the packet is allowed before it is returned. When a packet cannot reach its destination because the TTL value is too low, the last host returns the packet and identifies itself. By sending a series of packets and incrementing the TTL value with each successive packet, traceroute identifies the intermediary hosts.

Another technique used to determine network paths is by obtaining a Border Gateway Protocol (BGP) table. As each node within a network has a BGP routing table denoting the network devices that the node communicates with, obtaining a source's BGP routing table will enable a network operator to determine the path that packets take from the source node.

In both the BGP routing table technique and the traceroute technique, however, a network operator must have direct access to the source node to discover a network path. In particular, the traceroute utility requires packets to be sent from the source node to determine the path that they take. Similarly, when a network operator determines a path using a BGP table, the network operator has to obtain the BGP table from the source node to determine the complete path taken by the packets.

Unfortunately, in today's Internet, asymmetric routing is commonly used. Asymmetric routing is when the path from node n1 to node n2 is different than the path from node n2 to node n1. Asymmetric routing may occur, for example, because of policy-based interdomain routing (i.e., routing policies that selectively cause packets to take different paths). As a result, when a network operator only has access to a source node, determining the path in the reverse direction (i.e., from the destination node to the source node) is virtually impossible. The problem becomes even more challenging when direct access to the source and destination nodes are unavailable.

BRIEF SUMMARY OF THE INVENTION

The present invention provides a method and apparatus for inferring network (i.e., AS) paths between two endpoint nodes communicating over a network without having access to the endpoint nodes. The method and apparatus determine routing tables of at least some of the plurality of nodes. A relationship between each node is then inferred from the routing tables. The method and apparatus then determine a path between the two endpoint nodes from the relationship and the routing table determination.

In one embodiment, a graphical representation of the nodes is generated from the routing tables. The graphical representation includes nodes and links connecting the nodes.

Determining the path further includes inferring a first hop autonomous system (AS) that a packet sent from one endpoint travels to before reaching the other endpoint. The inferring of a first hop AS traveled to by a packet further includes gathering a list of candidate first hop ASes and identifying a transition point likely to be on the path. The identification of a transition point includes determining a first hop count from the source node to the transition point, determining a second hop count from the transition point to the destination node, and determining a third hop count from the source node to the destination node. In one embodiment, the method and apparatus determine whether the first hop count plus the second hop count equals the third hop count. To determine the second hop count and the third hop count, the method and apparatus use a time-to-live (TTL) value of an Internet Protocol (IP) packet. The first hop count can be obtained from direct measurement.

These and other advantages of the invention will be apparent to those of ordinary skill in the art by reference to the following detailed description and the accompanying drawings.

BRIEF DESCRIPTION OF THE DRAWINGS

FIG. 2 is a flowchart showing the steps performed by a path inference tool used to infer autonomous system paths in the network in accordance with an embodiment of the invention;

FIG. 3 includes algorithms that are implemented by the path inference tool; and

DETAILED DESCRIPTION

Figure 1:
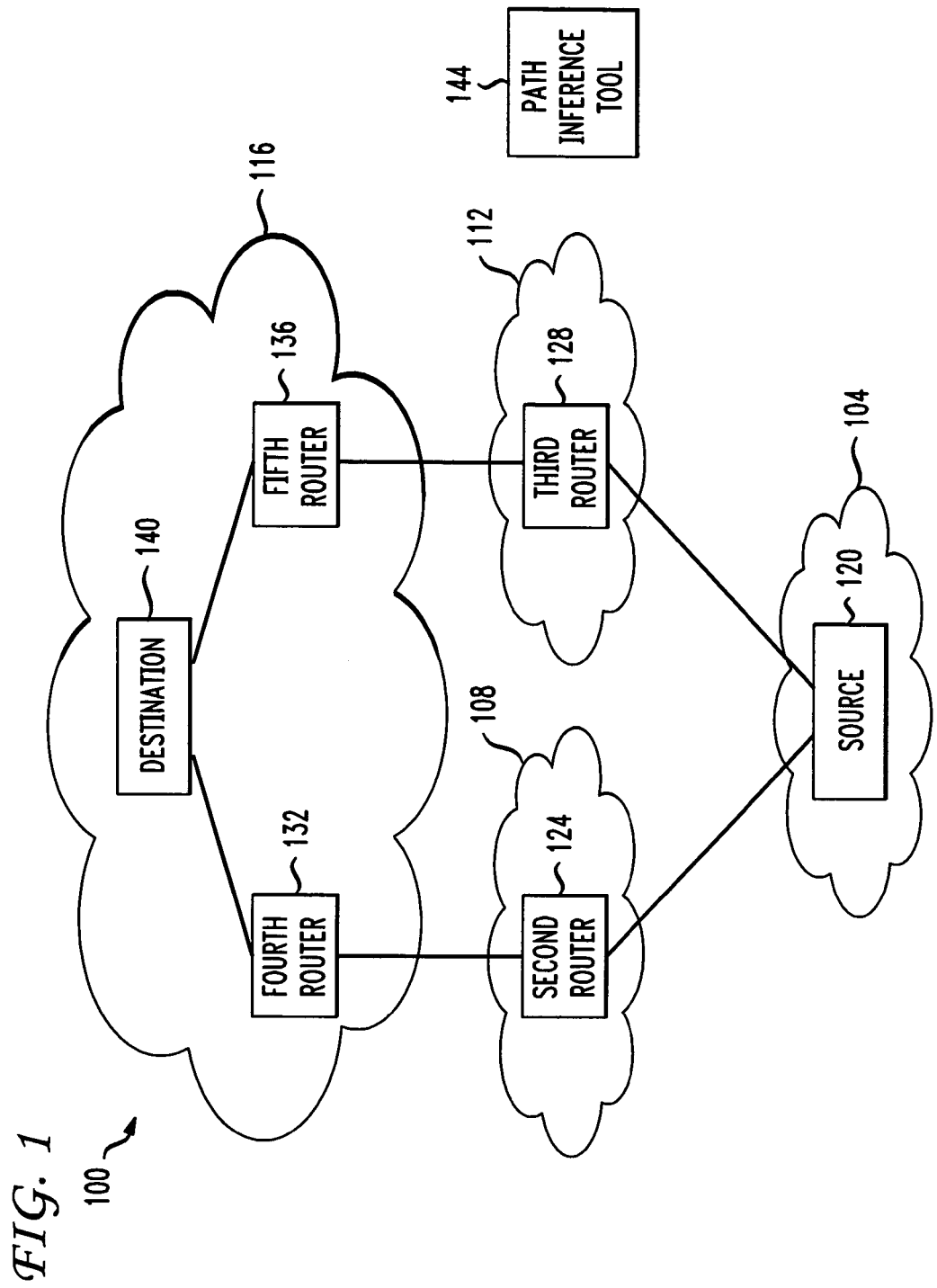
FIG. 1 shows a high level block diagram of a network in accordance with an embodiment of the invention.

FIG. 1 shows a high level block diagram of a network 100 in accordance with an embodiment of the invention. The network 100 includes a first, second, third, and fourth autonomous system (AS) 104, 108, 112, 116, respectively. The first AS 104 includes a source router (also referred to as source) 120. The source router 120 is connected to the second AS 108 (i.e., a second router 124) and the third AS 112 (i.e., a third router 128). The second router 124 communicates with a fourth router 132 in the fourth AS 116 while the third router 128 communicates with a fifth router 136 in the fourth AS 116. Both the fourth and fifth routers 132, 136 communicate with a destination router (also referred to as destination) 140.

To communicate a message to the destination router 140, the source router 120 selects the address of the next hop router (e.g., the second router 124 or the third router 128). This router then selects the next hop router (e.g., the fourth router 132, the fifth router 136, or some other router (not shown)). This selection continues until the message (i.e., each packet of the message) reaches the destination 140. This routing depends on a routing table stored within each router. The routing table is typically dynamically maintained to reflect the current topology of the network 100. Such routing is well-known in the art.

As described above, each router 120, 124, 128, 132, 136 communicates with other routers in the network 100 using the Border Gateway Protocol (BGP), which is a protocol for exchanging routing information between routers of different ASes 104, 108, 112, 116. In particular, routers communicate by transmitting update messages (triggered by routing changes) to each other. These update messages may be sent periodically, such as once every thirty seconds. The neighboring router transmits this information to its neighbor and so forth until all routers within the network have the same knowledge of routing paths (a state known as network convergence).

A router may also transmit update messages to other routers to notify the routers of a particular routing change. For example, if a network destination (e.g., a router) becomes unreachable because of a hardware failure, the router that detects the problem redirects the traffic to an alternate router so that data continues to be transmitted. The detecting router also transmits an update message regarding the alternate path to the other routers.

In one embodiment, the same Internet Service Provider (ISP) administers the second and third ASes 108, 112. Thus, the ISP has access to the second router 124 and the third router 128 but does not have access to either the source router 120 or the destination router 140. The present invention infers the paths that a message from the source 120 to the destination 140 travels in the network 100 without access to the source 120 and destination 140.

Also referring to FIG. 2, the present invention includes a path inference tool 144 to infer the paths of the network 100. The path inference tool 144 first obtains the BGP tables from multiple network vantage points (i.e., locations in the network that can provide a broad view of the network) in step 200. The path inference tool 144 obtains the BGP tables from a publicly available source, such as a predetermined web site. The path inference tool 144 then generates a graph of the AS topology based on the BGP tables. Each vertex of the graph corresponds to an AS, and two vertices are joined by an edge if there is at least one physical link between the corresponding ASes.

While the AS topology provides information about the connections between ASes, the relationships between ASes are also important because these relationships determine the routing policies and thus the paths that packets can potentially take in the network. For example, if an AS X is connected to an AS Y, then Y can be a customer, provider, or peer of X. A provider-customer relationship is a relationship in which the customer typically pays the provider money for transit (i.e., access to all destinations in its routing table). A peer-peer relationship is a relationship in which respective customers' traffic is exchanged for free. If Y is a customer of X, then X announces all its routes to Y. If Y is a provider or a peer of X, then X announces only the routes to destinations in its own AS and to destinations announced by its own customers. It typically does not announce routes to destinations that it can reach only through another provider or through peers.

In step 206, the path inference tool 144 then infers the relationship between AS paths between the source 120 and destination 140 without having access to the source 120 or destination 140 by using information from the BGP tables collected from multiple vantage points. AS relationships can be inferred using a variety of algorithms. In one embodiment, the path inference tool 144 infers the relationship between AS paths based on the degree of ASes along with the AS paths extracted from the BGP tables. In another embodiment, the path inference tool 144 develops heuristics for inferring AS relationships. The heuristic can leverage multiple vantage points and may yield a small number of invalid paths.

Based on the inferred AS relationships, edges in the AS graph are grouped into the following categories—(i) customer-provider link (UP link), (ii) provider-customer link (DOWN link), (iii) peering links (FLAT link). Edges with unknown AS relationships are excluded.

In another embodiment, the path inference tool 144 infers AS relationships based on the following:

Let G=(V, E) be the directed graph that consists of both directions of every edge that is contained in some BGP paths. For any directed edge $e_i=<x,y>$, a variable relation($e_i$) is used to indicate whether the link is FLAT, UP, or DOWN.

1 if $e_i$ is customer-provider relation($e_i$)=2 if $x$ and $y$ are peers 3 if $e_i$ is provider-customer The following constraints are then introduced:

For every edge $e_i$, let $e_r$ be the edge corresponding to its reverse direction.

relation($e_i$)+relation($e_r$)=4 relation($e_i$)∈{1,2,3} relation($e_r$)∈{1,2,3}

Every path is valley free (i.e., a legal path), or equivalently, every FLAT or DOWN link is followed by a DOWN link. For any ($e_i$, $e_j$) appearing on some valid BGP path, relation($e_i$)=1 ∨ relation($e_j$)=3

Given any (source, destination), if there is a path P from source 120 to destination 140 and it is shorter (in terms of hop count) than the actual path, then P is not valley-free. In other words, there exists ($e_i$, $e_j$) on P such that:

relation($e_i$)≠1^relation($e_j$)≠3

To reduce the number of constraints generated by the path inference tool, the path inference tool 144 only adds the non-valley-free constraints for the paths that have the shortest hop-count (without considering AS-relationship) and shorter than the actual routing paths.

To find relation($e_i$) that satisfies as many constraints as possible, all links are initialized to be DOWN links (i.e., provider-customer links) because most paths from the obtained vantage points are towards customers. The path inference tool 144 then implements the algorithms shown in FIG. 3.

In one embodiment, walk_prob=0.5, maxFlips=15000, and maxNoProg=1000. The first algorithm randomly selects an unsatisfied edge e and changes Relation(e) if a random number is less than walk_prob. Alternatively, for all unsatisfied edges and all possible relationships, the algorithm determines the change that results in the largest reduction in the number of unsatisfied constraints by implementing the greedy (i.e., second) algorithm. These algorithms also handle non-binary variables.

To reduce the problem size, the path inference tool 144 repeatedly applies a stub AS removal procedure. A stub AS is an AS that is only connected to one other AS. This procedure reduces the number of nodes and edges by up to two orders of magnitude. The procedure is shown below:

```
S=stubAS(G)
while (S is not empty) {
  for (each n in S) {
    for (each <p, n> in E) {
      mark p as the provider of n;
    }
  }
  G=subgraph (G, V−S);
  S=stubAS (G)
}
``` where stub ASes are the sinks of directed graph G=(V, E) with outdegree of zero.

Additionally, the path inference tool 144 skips over the edge whose number of unsatisfied constraints is fewer than max_prog, since changing the relationship assignment for the edge cannot reduce the number of unsatisfied constraints by more than max_prog. This leads to an increase in speed by up to two orders of magnitude.

Once the AS relationships have been inferred, the path inference tool 144 computes the shortest AS path in step 208. The path inference tool 144 bases this determination on the inferred relationship and the graph generated in step 204.

One reason for inaccurate AS path inference is inaccurate AS relationship inference. One way in which this inaccuracy manifests itself is through mismatches due to inferred paths being longer than actual paths. Typically, mismatches occur at the first hop AS due to, for example, traffic engineering practices by ISPs or load-balancing actions by customers with multiple upstream providers.

To determine the shortest AS path, the path inference tool 144 infers the first AS hop. The determination of the first AS hop for the path can improve the accuracy of the inferred AS path.

At a high level, the algorithm gathers a list of candidate first hop ASes from the source 120 and identifies the transition point T (i.e., the last hop before entering the first AS 104) that is likely to be on the path from the source 120 to the destination 140 by testing whether the following condition is satisfied, where hc(node1, node2) denotes the IP hop count (hc) from node1 to node2. Also, the source 120 is denoted with an S and the destination 140 is denoted with a D below.

$$hc(S,T)+hc(T,D)=hc(S,D)$$

The algorithm to infer the first AS hop from source 120 to destination 140 when there is only direct access to the destination 140 is as follows:

1. Use public traceroute servers to launch traceroute probes to the source 120, map each IP-level forwarding path to AS-level path, record each last-hop (e.g., the second AS 108) and transition point T directly connected to the source 120 (e.g., the second router 124).
2. find transition point T* that is most likely to be on the path from the source 120 to the destination 140, and report its AS as the inferred first hop AS
   1. Apply heuristics to infer
   hc (S, D): IP hop count from source 120 to destination 140
   hc (S, T): IP hop count from source 120 to transition point T
   hc (T, D): IP hop count from transition point T to destination 140
2. Find transition point T* that minimizes $$|hc(S,T)+hc(T,D)-hc(S,D)|$$

In more detail, to obtain a list of candidate first hop ASes, the path inference tool 144 launches traceroute probes from multiple public traceroute servers towards the source 120. If the locations from which traceroute is launched are diverse enough, the path inference tool 144 can determine at least one path whose last hop AS matches the first hop AS for the path from source 120 to destination 140. Specifically, for each transition point T, the path inference tool 144 first applies heuristics to infer the IP-level hop counts hc(S, T), hc(T, D), and hc(S, D). The path inference tool 144 then determines whether T satisfies the condition as described above:

$$hc(S,T)+hc(T,D)=hc(S,D)$$

The path inference tool 144 then infers the hop counts hc (S, T), hc (T, D), and hc (S, D). The path inference tool 144 estimates hc(S, T) using hc(T, S) which is available through the IP-level forwarding path. This assumes that the path between the two routers S and T within the same AS is symmetric in terms of hop count, i.e., hc(T, S)=hc(S, T). Thus, the path inference tool 144 can obtain a shortest path from S to T by reversing the shortest path from T to S.

To infer hc(T, D) and hc(S, D), the path inference tool 144 takes advantage of the Time-to-Live (TTL) value contained in IP packets. In particular, the path inference tool 144 transmits a ping packet (i.e., an Internet Control Message Protocol echo request) to a remote host. The remote host sends a response back with the TTL value of the response packet initialized by the remote host and decremented by one at each router on the return path. Therefore, if the path inference tool 144 estimates the initial TTL value ($TTL_0$), then, based on the TTL value of the received response packet ($TTL_1$), the path inference tool 144 can estimate the path length from the remote host to the destination 140 as ($TTL_0-TTL_1+1$). In one embodiment, the value of $TTL_0$ is one of a small number of potential values and is based on $TTL_1$. Specifically, the path inference tool 144 estimates $TTL_0$ from $TTL_1$ using the formula $$TTL_0=\min\{255, 32 \cdot \lceil TTL_1/32 \rceil\}$$

It should be noted that the operators surrounding "$TTL_1/32$" indicate that the result of that division operation may be a decimal. The operators surrounding "$TTL_1/32$" takes the integer part of the decimal value.

Figure 4:
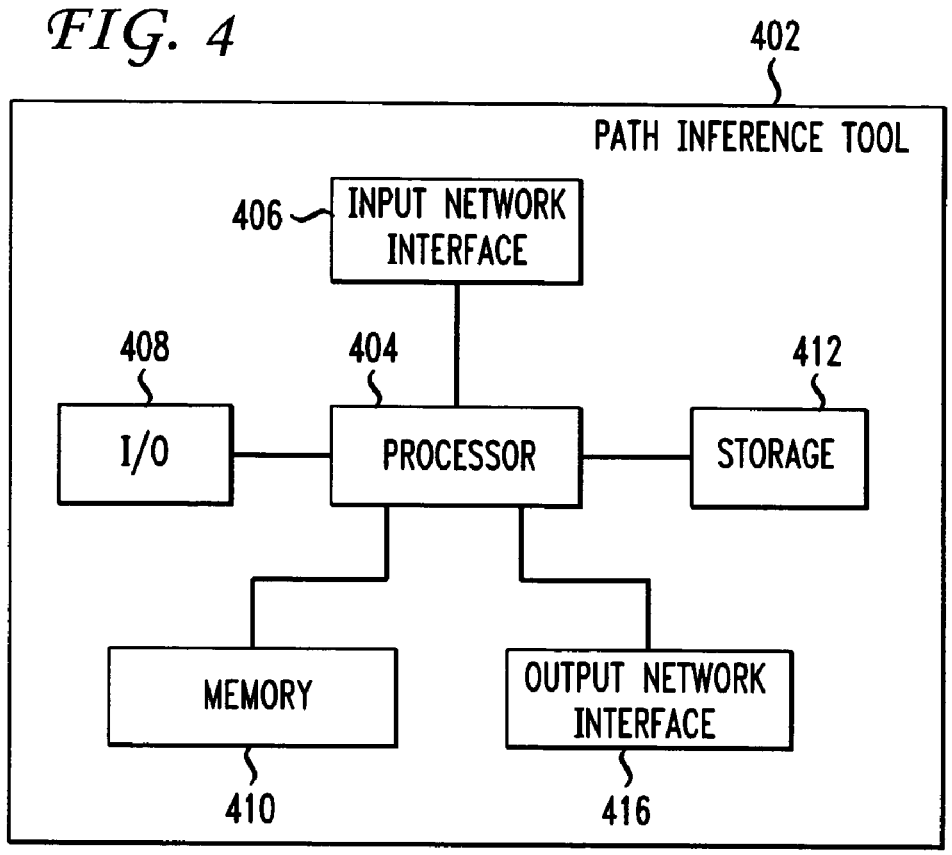
FIG. 4 is a high level block diagram of the path inference tool in accordance with an embodiment of the invention.

FIG. 4 shows a high level block diagram of a computer implementation of the path inference tool. Path inference tool 402 contains a processor 404 which controls the overall operation of the computer by executing computer program instructions which define such operation. The computer program instructions may be stored in a storage device 412 (e.g., magnetic disk, database) and loaded into memory 410 when execution of the computer program instructions is desired. Thus, the path inference tool 402 operation will be defined by computer program instructions stored in memory 410 and/or storage 412 and the computer will be controlled by processor 404 executing the computer program instructions. Computer 402 also includes one or more input network interfaces 406 for communicating with other devices via a network (e.g., the Internet). Computer 402 also includes one or more output network interfaces 416 for communicating with other devices. Path inference tool 402 also includes input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for inferring a path between a first endpoint node and a second endpoint node in a network comprising:
   obtaining a plurality of Border Gateway Protocol (BGP) routing tables;
   generating a graph of the network topology based on the plurality of BGP tables, the graph of the network topology comprising a plurality of nodes and edges, each of the nodes associated with an autonomous system (AS) and each of the edges associated with a connection between two autonomous systems;
   applying a stub removal procedure to generate a stubbed graph of the network topology, the stubbed graph removal procedure comprises removing from the graph of the network topology each of the plurality of nodes that is connected to a single edge;
   inferring at a processor relationships between nodes in the network based on the plurality of BGP routing tables without having access to at least one of the first endpoint node and the second endpoint node, the relationships including customer-provider links, provider-customer links, and peering links, each of the relationships being associated with a respective routing policy;
   identifying a point, wherein the point is a first hop autonomous system (AS) that a packet sent from the first endpoint node travels to before reaching the second endpoint node, wherein identifying a point comprises:
      determining a first hop count from first endpoint node to the point, a second hop count from the point to the second endpoint node, and a third hop count from the first endpoint node to the second endpoint node; and
      identifying the point as a transition point based on a comparison of the first hop count, the second hop count and the third hop count; and
   determining at the processor the path between the first endpoint node and the second endpoint node, based on the transition point, the routing policies associated with the relationships and the stubbed graph of the network topology.

2. The method of claim 1 further comprising generating a graphical representation of the plurality of nodes from the routing tables.

3. The method of claim 2 wherein the graphical representation further comprises edges and links connecting the edges.

4. The method of claim 1 further comprising gathering a list of candidate first hop autonomous systems.

5. A system for inferring a path between a first endpoint node and a second endpoint node in a network comprising:
   means for obtaining a plurality of Border Gateway Protocol (BGP) routing tables;
   means for generating a graph of the network topology based on the plurality of BGP tables, the graph of the network topology comprising a plurality of nodes and edges, each of the nodes associated with an autonomous system (AS) and each of the edges associated with a connection between two autonomous systems;
   means for applying a stub removal procedure to generate a stubbed graph of the network topology, the stubbed graph removal procedure comprises removing from the graph of the network topology each of the plurality of nodes that is connected to a single edge;
   means for inferring relationships between nodes in the network based on the plurality of BGP routing tables without having access to at least one of the first endpoint node and the second endpoint node, the relationships including customer-provider links, provider-customer links, and peering links, each of the relationships being associated with a respective routing policy;
   means for identifying a point, wherein the point is a first hop autonomous system (AS) that a packet sent from the first endpoint node travels to before reaching the second endpoint node, wherein identifying a point comprises:
      means for determining a first hop count from first endpoint node to the point, a second hop count from the point to the second endpoint node, and a third hop count from the first endpoint node to the second endpoint node; and
      means for identifying the point as a transition point based on a comparison of the first hop count, the second hop count and the third hop count; and
   means for determining the path between the two endpoint nodes based on the routing policies associated with the relationships and the stubbed graph of the network topology.

6. The system of claim 5 further comprising means for generating a graphical representation of the plurality of nodes from the routing tables.

7. The system of claim 6 wherein the graphical representation further comprises edges and links connecting the edges.

8. The system of claim 5 further comprising means for gathering a list of candidate first hop autonomous systems.

* * * * *